MEMORY EMPLOYING TRANSISTOR STORAGE CELLS

Filed Sept. 15, 1967 2 Sheets-Sheet 1

INVENTOR
BORYS ZUK
BY [signature]
ATTORNEY

INVENTOR
BORYS ZUK
BY [signature]
ATTORNEY

United States Patent Office 3,533,087
Patented Oct. 6, 1970

3,533,087
MEMORY EMPLOYING TRANSISTOR STORAGE CELLS

Borys Zuk, Somerville, N.J., assignor to RCA Corporation, a corporation of Delaware
Filed Sept. 15, 1967, Ser. No. 667,927
Int. Cl. G11c *11/40*
U.S. Cl. 340—173 13 Claims

ABSTRACT OF THE DISCLOSURE

A four-transistor storage cell in which switching between states is accomplished by applying voltages to the input electrodes (the electrodes which act as the source of current carriers) of two of the transistors. An array of the cells may be arranged in "bit-organized" fashion.

BACKGROUND OF THE INVENTION

The inherently low cost with which it is now possible to batch fabricate large numbers of semiconductor devices, such as transistors of the insulated-gate, field effect type, has made it practical to employ arrays of storage cells made of such devices for the storage of binary information. One such cell, shown in FIG. 19*b* of Weimer Pat. No. 3,191,061, comprises two branch circuits, each such circuit having a P-type and an N-type transistor connected drain-to-drain. The drains of the transistors in each branch circuit are connected to the gates of the transistors in the other branch circuit. The cell is switched from one state to the other by applying a control signal to a common drain-gate connection of the cell.

In the Weimer circuit, because one of the transistors to which the control signal is applied is "on" in its quiescent condition, it acts as a low impedance and tends to shunt a portion of the control signal to ground. The remaining portion of the control signal does switch the storage cell from one state to another but, because of its low effective amplitude, the switching time is relatively long. The transistors of the memory cell may be selected to have an impedance which is higher than that of the input circuit to the memory cell to lessen the amount of the control signal which is shunted to ground. However, this introduces another difficulty in that it increases the time required, after the switching has started, for the storage cell to attain its new state.

One solution to the problem above is shown in FIG. 3 of the article, "Silicon on Sapphire Complementary MOS Memory Systems" by J. F. Allison, J. R. Burns and F. P. Heiman, appearing in the 1967 ISSCC Digest of Technical Papers at page 76. This solution involves the use of one additional transistor in the coupling loop between the drain electrodes of the transistors in one branch circuit and the gate electrodes of the transistors in the other branch circuit. This transistor is turned off while the state of the flip-flop is being changed so that there is no source-to-drain path of an on transistor connected to the input terminal of the circuit during the writein period. While this circuit does provide improved performance, it does require at least one and possibly two additional transistors and it also requires additional silicon area. Both are disadvantages in that they make the circuit more expensive than the storage cell of the Weimer patent and, in view of the larger area per cell which is needed, the bit packing density which is possibly is lower than that of the Weimer cell. In addition, the cells of the article, while suitable for word organized memory arrays, are not specially adapted for a bit organized array.

The object of the present invention is to provide an economical storage cell, that is, one which requires only four transistors, which operates at relatively high speed, and which is suitable for use in a bit organized array.

BRIEF SUMMARY OF THE INVENTION

The storage cell of the invention comprises four transistors arranged in two branch circuits, each branch circuit comprising a transistor of one conductivity type connected to a transistor of another conductivity type, output electrode-to-output electrode. The output electrodes of each branch circuit are connected to the control electrodes of the transistors in the other branch circuit. The state of the cell is changed by applying signals to the input electrodes of the transistors of one conductivity type.

DETAILED DESCRIPTION

The semiconductor devices contemplated for use in practicing the invention are of the general type known as insulated-gate, field-effect transistors. However, it is to be understood that other devices which have suitable operating characteristics may be employed instead.

Figure 1:
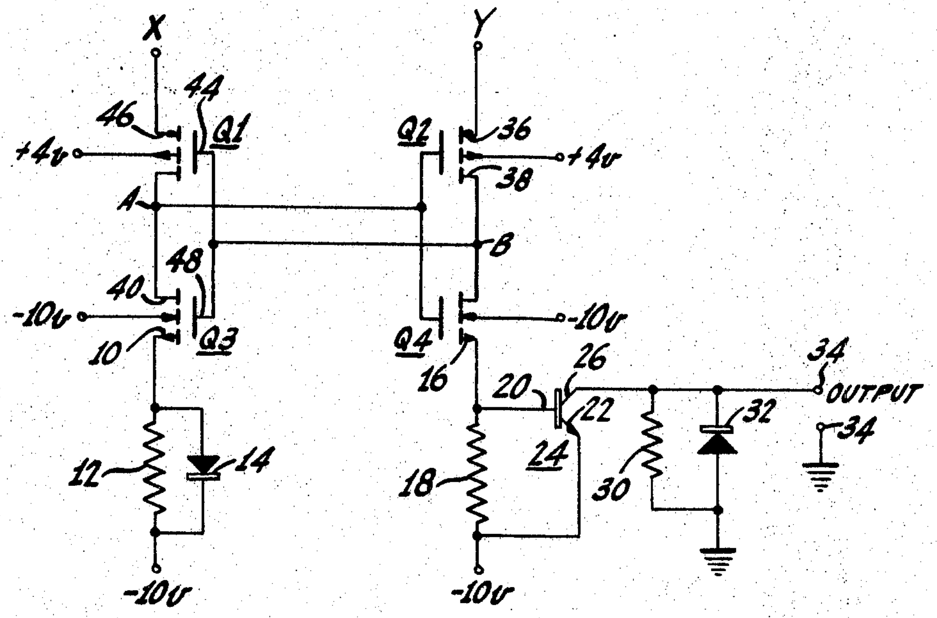
FIG. 1 is a schematic diagram of a memory cell according to the invention.

The storage cell of FIG. 1 includes four insulated-gate, field-effect transistors Q1, Q2, Q3 and Q4. The cell comprises two branch circuits, each branch circuit including a P-type transistor, such as Q1, connected drain-to-drain with an N-type transistor, such as Q3. The source electrode 10 of transistor Q3 ts connected through the parallel circuit consisting of resistor 12 and diode 14 to a source of —10 volts. The source electrode 16 of transistor Q4 is connected through the parallel path comprising resistor 18 and the base 20-to-emitter 22 diode of an NPN-bipolar transistor 24, also to a source of —10 volts. The collector 26 of transistor 24 is connected to ground through the parallel circuit made up of resistor 30 in shunt with diode 32. The substrates of the P-type transistors are connected to a source of +4 volts; the substrates of the N-type transistors are connected to a source of —10 volts. The output of the circuit is available at terminals 34.

The circuit of FIG. 1 may be switched from one storage state to its other storage state by appropriate voltages applied to the terminals legended X and Y. To switch the circuit to one state, a voltage such as +4 volts is applied to one of the terminals and a voltage such as —4 volts is applied to the other terminal. To switch the circuit to its other storage state, these voltage conditions are reversed. During the quiescent condition of the storage element, both the X and Y terminals are maintained at some reference voltage value, such as ground.

To explain how the circuit of FIG. 1 operates, it may be assumed arbitrarily the transistors Q2 and Q3 initially are on and transistors Q1 and Q4 initially are off. This circuit state may be considered the 1 state. In the on condition of an insulated-gate, field-effect transistor of the type employed herein, there is a low impedance from its source electrode to its drain electrode, that is, through its conduction channel. Thus, in the "1" circuit state, there is a low impedance between the source electrode 36 and the drain electrode 38 of transistor Q2 so that terminal B in the circuit is at substantially the same voltage as terminal Y. It may be assumed the circuit is in its quiescent condition so that terminals X and Y are both at ground as is terminal B.

There is also a low impedance between the source 10 and drain 40 of transistor Q3 so that there is conduction from the −10 volt source through the low forward impedance of diode 14 and the low impedance of the source-to-drain path of transistor Q3 to point A, placing point A at approximately −10 volts.

The −10 volts present at terminal A is a forward bias for transistor Q2 and maintains this transistor on; however, it provides zero bias for transistor Q4 (there is also −10 volts present at its source electrode 16) and maintains this transistor off. The zero volts present at point B places a zero bias on transistor Q1 and this transistor remains off. However, the zero volts present at the gate of transistor Q3 is in the forward direction relative to its source voltages of −10 volts so that transistor Q3 remains on.

The amount of current conducted by the storage cell of FIG. 1 in the quiescent condition of this cell is negligible. Current flows through the conduction channels of transistors Q1 and Q3. However, as the conduction channel for transistor Q1, that is, the source-to-drain path of this transistor, is at a relatively high impedance and as this path is in series with the conduction path through transistor Q3, very little (leakage) current flows in this circuit. Similarly, the high impedance of the conduction channel of transistor Q4 prevents much current from flowing through the series circuit of the conduction channels of transistors Q2 and Q4.

When it is desired to change the state of the circuit of FIG. 1 to its "0" state, +4 volts is applied to the X terminal concurrently with the application of −4 volts to the Y terminal. The X and Y voltages are those illustrated during the period $t_2$ to $t_3$ in FIG. 2. As transistor Q2 initially is on, its conduction channel is of low impedance and −4 volts appears at B. Now the transistor Q1 becomes forward biased to the extent of 8 volts as there is −4 volts on its gate 44 and +4 volts present on its source 46. Transistor Q3 is also forward biased; however, only to the extent of 6 volts as there is −4 volts present at its gate 48 and −10 volts present at its source 10. Accordingly, transistor Q1 begins to conduct more heavily than transistor Q3. When this happens, point A which formerly was at −10 volts, is driven toward the voltage at terminal X, namely toward +4 volts.

The action described above is regenerative. Transistor Q4 starts to conduct more heavily than transistor Q2 and point B is driven from its initial value of −4 volts toward −10 volts. In an extremely short time (the switching time is approximately 75 nanoseconds), the circuit stabilizes with transistors Q1 and Q4 on and transistors Q2 and Q3 off.

It has been found that the memory cell of FIG. 1 has optimum performance when the circuit is symmetrical. This implies that there be the same load for the two branch circuits, that is, the same load on transistors Q1, Q3 as there is on transistors Q2, Q4. The load circuit, comprising resistor 12 and diode 14, is intended to present the same impedance as the circuit comprising the resistor 18 and the base-to-emitter diode 20–22 of transistor 24. This implies that resistor 12 should be of the same value as resistor 18 and, in practice, this is the case. It also implies that the characteristic of diode 14 should be similar to that of the base-to-emitter diode of transistor 24. With this arrangement, that is, the one shown in FIG. 1 it is found that the static and transient load characteristics for the two branches are essentially identical.

With the circuit load impedances of equal value, as discussed above, the X and Y select voltages may be of the same value. However, the circuit can be operated with different X and Y voltages and in this case the resistors 12 and 18 may be of different values.

During the time the +4 volt X voltage and the −4 volt Y voltage appear simultaneously (pulses 52 and 54 of FIG. 4), the cell switches from its "1" to its "0" state and transient current flows in the emitter-to-base circuit of the sense transistor 24 turning this transistor on and causing an output signal 50 to appear at the output terminal 34. This signal, in one particular circuit, has an amplitude of 0.8 volt and may be employed as the sense signal of an array of such elements. The diode 32 insures that the output signal will not exceed this level. If desired, the output signal can be clamped to a higher level by biasing this diode, for example.

Even though as mentioned above, there is very little power dissipation in the memory circuit of FIG. 1 when the circuit is in its quiescent state, there is some small amount of leakage current which does flow. If the resistor 18 were not present, the leakage current applied to the base 20 of transistor 24 would cause partial conduction of the transistor. Any slight disturbance as, for example, would occur during a partial select condition or other noise impulses could, in this case, cause the transistor to turn on and produce an undesirable output signal. The purpose of resistor 18 is to shunt this leakage current and also to shunt noise. The value of the resistance determines the amount of noise immunity of the circuit. As previously mentioned, since the resistor 12 is of the same value as resistor 18, the value of resistor 18 which gives optimum noise cancellation, will be equal to that chosen for the resistor 12.

During the operation of a memory cell such as shown in FIG. 1 as part of a multiple cell matrix, different combinations of X and Y voltages may be present. For example, during the period $t_0$–$t_1$, +4 volts is present at the X terminal while the Y terminal is at ground. This corresponds to a "half-select" condition of a memory cell and the particular cell which receives this combination of voltages should produce no output.

During the period $t_4$ to $t_5$ the X terminal receives a voltage of −4 volts and the Y terminal is at ground. This corresponds to a half-select condition of a memory cell. No information should be written into the cell in response to this combination of voltages.

During the period $t_6$ to $t_7$, −4 volts is applied to the X terminal and +4 volts to the Y terminal. This corresponds to writing a "1" into a memory cell and results in turning the transistors Q2 and Q3 on and transistors Q1 and Q4 off. A detailed explanation of how the switching occurs is believed not to be necessary in view of the explanation already given of how the memory cell is switched from its "1" storage state to its "0" storage state.

The periods $t_8$–$t_9$ and $t_{10}$–$t_{11}$ correspond to the other two partial select conditions. No information should be written during the period $t_8$–$t_9$ and no output should be produced during the period $t_{10}$–$t_{11}$.

Figure 2:
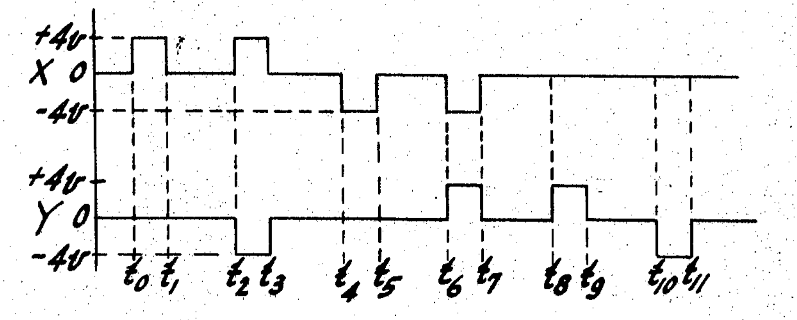
FIG. 2 is a drawing of waveforms to help explain the operation of the cell of FIG. 1.

Of the various condition depicted in FIG. 2, only the write "0" (period $t_2$–$t_3$) or write "1" condition (period $t_6$–$t_7$) causes the cell to switch. It readily can be shown that if either the X or Y terminal is at +4 volts while the other terminal is at 0 volts, then the forward biases applied to two transistors in series are in the ratio of 10 volts to 4 volts and the state of the memory cell remains undisturbed.

The other partial select condition occurs when either X or Y terminal is at −4 volt and the other terminal at ground. Here, the forward biases under worst case condition applied to the two transistors in series are in the ratio of 6 volts (for N-type) to 4 volts (for P-type) and no switching occurs.

Figures 3, 4:
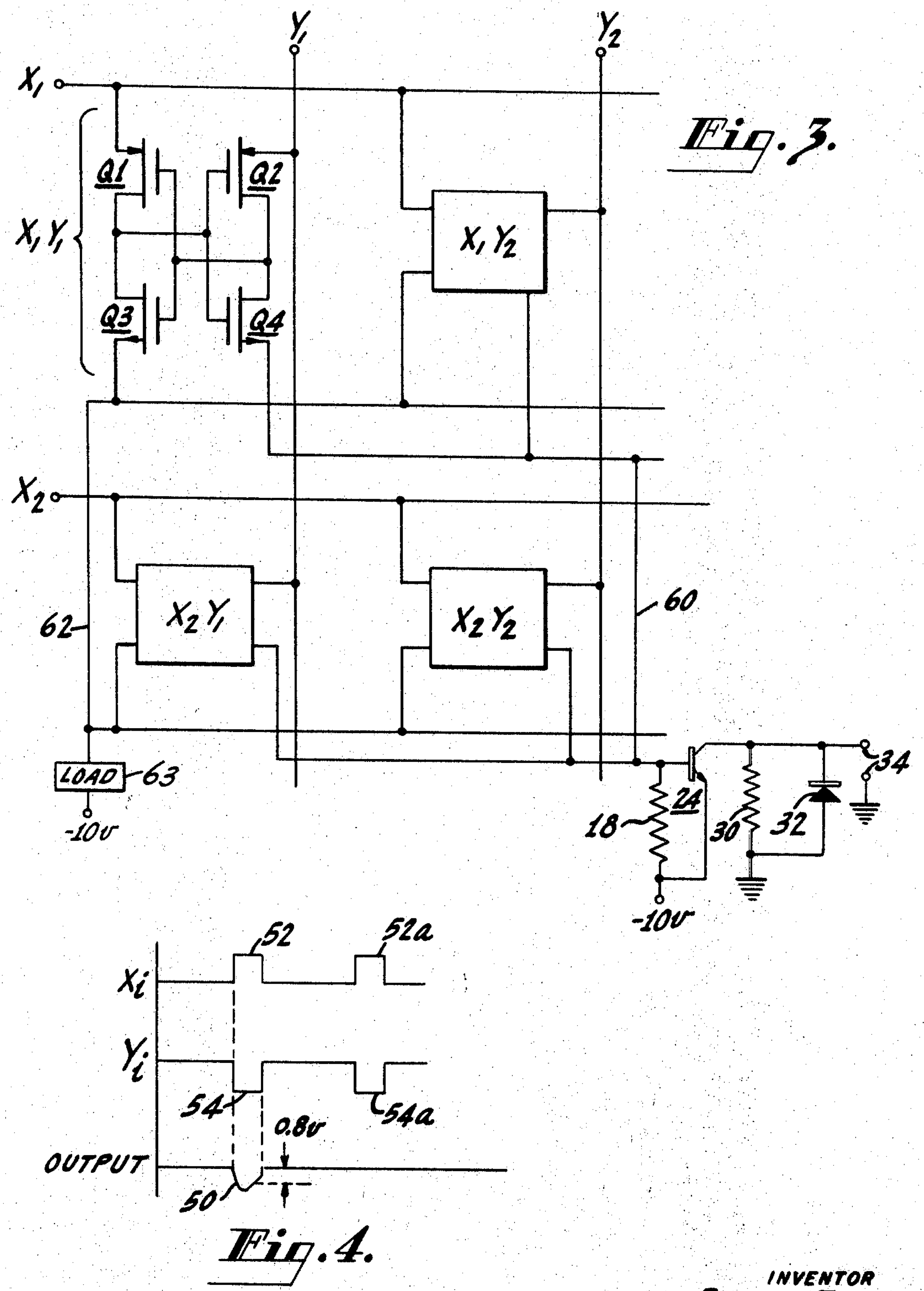
FIG. 3 is a drawing of a two-by-two bit organized array employing the memory cell of FIG. 1.
FIG. 4 is another drawing of waveforms to help explain the operation of the memory cell of the invention.

The memory cell of FIG. 1 may be connected in a bit organized array in the manner shown in FIG. 3. The two-by-two array is intended to be illustrative only as, in practice, there may be many more than four memory elements. To simplify the drawing, the connections to the substrate are not shown. Similar parts in FIG. 3 and FIG. 1 are identified by the same reference characters.

A "1" may be written into a selected cell by applying a +4 volt pulse to a selected Y conductor at the same time that a −4 volt pulse is applied to a selected X conductor. A "0" may be written into a cell by applying a +4 volt pulse to a selected X conductor at the same time that a −4 volt pulse is applied to a selected Y conductor. A cell may be read out by attempting to write a "0" into the cell. For example, if the cell $X_1$, $Y_1$ initially is storing a "1" (transistors Q2 and Q3 on; transistors Q1 and Q4 off) and +4 volts is applied to lead $X_1$ concurrently with the application of −4 volts to lead $Y_1$, the output signal 50 of FIG. 4 will appear across output terminals 34. If now the read signals 52, 54 of FIG. 4 are removed, the cell $X_1$, $Y_1$ will continue to store "0," i.e., readout is destructive. Now, if it is attempted to read out the cell again by applying the read signals 52*a*, 54*a*, as shown in FIG. 4, since the cell is already storing a "0," it will not be switched. No output signal will be produced at output terminals 34 and this absence of an output signal is indicative of the storage of a "0."

An important advantage of the memory cell of the present invention is that the control or switching signal applied to the X or Y line always "sees" a high impedance. For example, if transistor Q2 is initially conducting, a switching signal applied to the Y terminal of FIG. 1 cannot partially be shorted out. While the conduction channel of transistor Q2 does have a low impedance, transistor Q4 is off, that is, its conduction channel is of relatively high impedance. Similarly, there is extremely high impedance between the source and gate electrode of transistor Q2. A similar analysis is applicable to other input conditions and to the other conducting state of the circuit.

In the operation described so far, the read out of the memory cell is destructive, that is, if a cell initially is storing a "1," when this "1" is read out of the cell the stored information is destroyed. In other words, the cell, after the read out has been completed, stores a "0." It is possible, however, to operate the storage cell in a nondestructive mode. For operation in this way, the read out drive pulses are reduced in amplitude to only two volts. Considering the circuit of FIG. 1 in its "zero" state (transistors Q1 and Q4 on and transistors Q2 and Q3 off), a +2 volt pulse (or level) is applied to the Y terminal and a −2 volt pulse (or level) is applied to the X terminal. Due to transistor Q1 being on, point A attains a voltage level of −2 volts, forward biasing transistor Q2 by 4 volts. This slight forward bias produces a slight current in the drain (terminal 38) which is passed through transistor Q4 (transistor Q4 is on) to the read out circuit. Since transistor Q4 is forward biased by 8 volts, there is no switching. When the circuit is in the "1" state and it is attempted to read out the circuit in the same way, there is no read out current, hence the two states of the cell are distinguished.

Due to the small read out current, the time for this operation is found, in practice, to be longer than for the destructive read out.

While not meant to be limiting, for purpose of illustration, a memory cell such as shown in FIG. 1, operated in the destructive read out fashion, may be constructed with circuit elements of the following values:

| | |
|---|---|
| P-type transistors Q1 and Q2: | |
| Drain-to-source breakdown voltage | 25 volts. |
| Transconductance $g_m$ (at a drain-to-source voltage of 3 volts) | 2.5 volts. |
| Threshold voltage | 600 $\mu$mhos. |
| N-type transistors Q3 and Q4: | |
| Drain-to-source breakdown voltage | 20 volts. |
| Threshold voltage | 800 $\mu$mhos. |
| Transconductance $g_m$ (at a drain-to-source voltage of 3 volts) | 2 volts. |
| Resistors **12** and **18** | 100,000 ohms. |
| Diodes **14** and **32** | Type 1N914. |
| Transistor **24** | Type 2N2475. |

In the matrix illustrated in FIG. 3, the sense amplifier is shown connected to the common line 60. The other load, shown as block 63, is connected to the common line 62. The positions of these two circuits can be reversed, if desired. In the reverse positions, the read signals would correspond to those employed for writing a "1" into the circuit. It is also to be understood that the load 63 may be the resistor 12, diode 14 equalizing load of FIG. 1 or it may instead be only a resistor and transistor 24 or a complete second sense circuit 18, 24, 30, 32. The advantage of the last alternative is that it permits obtaining two different sense signals. Further, since identical transistors may be employed in both of the last two alternatives, the two loads will always be perfectly balanced.

A feature of the circuit of FIG. 3 is that only two load circuits (63 and 18, 24 . . .) are required for the entire matrix, regardless of the number of storage elements in the matrix. In previous arrangements, one load was employed per column (or row) of elements. A further feature of the present arrangement is that the loads may be external of the matrix (external of the integrated circuit "chip") and this makes construction easy since it does not require the integration of unipolar with bipolar devices. Finally, there is no heating of the chip due to dissipation in the load resistors.

What is claimed is:

1. In combination:

a four-transistor storage cell, each such transistor having a conduction channel extending between an input and an output electrode and a control electrode for controlling the conductivity of said channel, said cell comprising first and second branch circuits, each branch circuit including a transistor of one conductivity type connected to a transistor of another conductivity type, output electrode-to-output electrode, and the output elecrodes of the transistors in each said branch circuit being connected to the control electrodes of the transistors in the other branch circuit; and control signal means coupled to the input electrodes of the transistors of said one conductivity type providing the sole means for establishing the conducting state of said storage cell.

2. In the combination set forth in claim 1, said control signal means applying: a signal which is relatively positive to one said input electrode and a signal which is relatively negative to the other said input electrode for placing said storage cell in one state; signals of polarities opposite to those given above to said two input electrodes for placing said storage cell in its other state; and voltages of the same value to said two input electrodes for causing said storage cell to retain its storage state.

3. In the combination set forth in claim 2, further including a source of forward voltage coupled to the input electrodes of the transistors of other conductivity type.

4. In the combination set forth in claim 3, further including a fifth transistor, this one having an emitter-to-base diode, said diode being connected to the input electrore of a transistor of said other conductivity type essentially in series in the forward direction with the conduction channel of said transistor of said other conductivity type.

5. In the combination as set forth in claim 3, said transistors comprising insulated-gate, field-effect transistors.

6. In combination:

a four-transistor storage cell, each such transistor having a conduction channel extending between an input and an output electrode and a control electrode for controlling the conductivity of said channel, said cell comprising first and second branch circuits, each branch circuit including a transistor of one conductivity type connected to a transistor of another conductivity type, output electrode-to-output electrode, and the output electrodes of the transistors in each said branch circuit being connected to the control electrodes of the transistors in the other branch circuit;

control signal means coupled to the input electrodes of the transistors of said one conductivity type for establishing the conducting state of sair storage cell; and two load circuits of similar static and dynamic characteristics, each connected in series with a different one of said branch circuits, each load circuit comprising a resistor and a diode in shunt with said resistor.

7. In the combination set forth in claim 6, one of said diodes comprising a two-terminal, positive resistance diode and the one of said diodes comprising the base-to-emitter diode of a transistor.

8. In the combination set forth in claim 6, further including a source of forward voltage for said four transistors, said load circuits being connected between said source of forward voltage and the input electrodes, respectively, of the transistors of said other conductivity type, said diodes being poled in the forward direction relative to said voltage source.

9. In combination:

a four-transistor storage cell, each such transistor comprising an insulated-gate, field-effect transistor having a conduction channel extending between a source and a drain electrode and a gate electrode for controlling the conductivity of said channel, said cell comprising first and second branch circuits, each branch circuit including a P-type transistor connected to an N-type transistor drain electrode-to-drain electrode and gate electrode-to-gate electrode, and the drain electrodes of the transistors in each said branch circuit being connected to the gate electrodes of the transistors in the other branch circuit;

control signal means coupled to the source electrodes of the transistors of one conductivity type providing the sole means for establishing the conducting state of said storage cell; and return path means for the control signals provided by said last-names means coupled to the source electrodes of the transistors of other conductivity type.

10. In the combination as set forth in claim 9, said return path means including respective balanced loads, that is, loads in each path whose impedances substantially correspond, both dynamically and statically.

11. In the combination set forth in claim 10, said return path means including a sensing transistor having an emitter-to-base diode which is connected in the forward direction to the conduction channel of one of said transistors of said other conductivity type.

12. In the combination set forth in claim 11, said return path means including a diode connected in the forward direction to the conduction channel of the other of said transistors of other conductivity type between said source of forward voltage and the source electrode of said transistor.

13. A memory comprising, in combination, a plurality of row conductors;

a plurality of column conductors;

a plurality of storage cells, each connected to one row conductor and one column conductor, each such cell comprising four field-effect transistors each with a conduction channel extending between a source and a drain electrode and a gate electrode for controlling the conductivity of sair channel, each cell comprising first and second branch circuits, each branch circuit including a P-type transistor connected to an N-type transistor drain electrode-to-drain electrode and gate electrode-to-gate electrode and the drain electrodes of the transistors in each said branch circuit being connected to the gate electrodes of the transistors in the other branch circuit, said connection to said row conductor comprising a connection from the source electrode of one transistor of one conductivity type, and said connection to said column conductor comprising a connection from the source electrode of the other transistor of said one conductivity type;

a first return path which is common to all storage cells connected to the source electrode of one transistor of said other conductivity type of all storage cells; and a second return path which is common to all storage cells connected to the source electrode of the other transistor of said other conductivity type of all storage cells.

References Cited

UNITED STATES PATENTS

| | | | |
|---|---|---|---|
| 3,191,061 | 6/1965 | Weimer | 340—173 |
| 3,355,721 | 11/1967 | Burns | 340—173 |
| 3,440,444 | 4/1969 | Rapp | 307—238 |

TERRELL W. FEARS, Primary Examiner

U.S. Cl. X.R.

307—238, 279